(12) United States Patent
Ruiz

(10) Patent No.: US 6,227,042 B1
(45) Date of Patent: May 8, 2001

(54) GLIDE HEAD WITH LOW SENSITIVITY

(75) Inventor: Oscar Jaime Ruiz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,798

(22) Filed: Jun. 14, 1999

(51) Int. Cl.⁷ ............................... G01B 5/20; G01B 7/34
(52) U.S. Cl. .............................................................. 73/105
(58) Field of Search ................................. 73/105; 360/103, 360/117, 120, 121, 122

(56) References Cited

U.S. PATENT DOCUMENTS

| | | |
|---|---|---|
| 4,218,715 * | 8/1980 | Garnier ................................. 360/103 |
| 5,086,360 | 2/1992 | Smith et al. . |
| 5,166,845 | 11/1992 | Thompson et al. . |
| 5,291,361 | 3/1994 | Yokota . |
| 5,423,207 | 6/1995 | Flechsig et al. . |
| 5,640,089 | 6/1997 | Horikawa et al. . |
| 5,673,156 | 9/1997 | Chen et al. . |
| 5,689,064 | 11/1997 | Kennedy et al. . |
| 5,808,184 * | 9/1998 | Boutaghou et al. .................. 73/105 |
| 5,942,680 * | 8/1999 | Boutaghou ............................. 73/105 |
| 6,069,770 * | 5/2000 | Cui et al. ............................. 360/103 |

* cited by examiner

Primary Examiner—Daniel S. Larkin
(74) Attorney, Agent, or Firm—Robert B. Martin; Felsman, Bradley, Vaden, Gunter & Dillon, LLP

(57) ABSTRACT

A glide head for burnishing or smoothing the surface of a magnetic disk has an air bearing on one side and a piezoelectric element on an opposite side. The air bearing comprises a patterned set of four or five air bearing surfaces (ABS) and etched pockets having multiple depths in the air bearing. The air bearing preferably has two front ABS, two middle ABS, and one rear ABS. This configuration gives the air bearing superior performance characteristics over prior art designs. When the glide head contacts a defect or asperity on the surface of the disk, the glide head vibrates and causes the piezoelectric element to become excited and emit a signal in response.

36 Claims, 6 Drawing Sheets

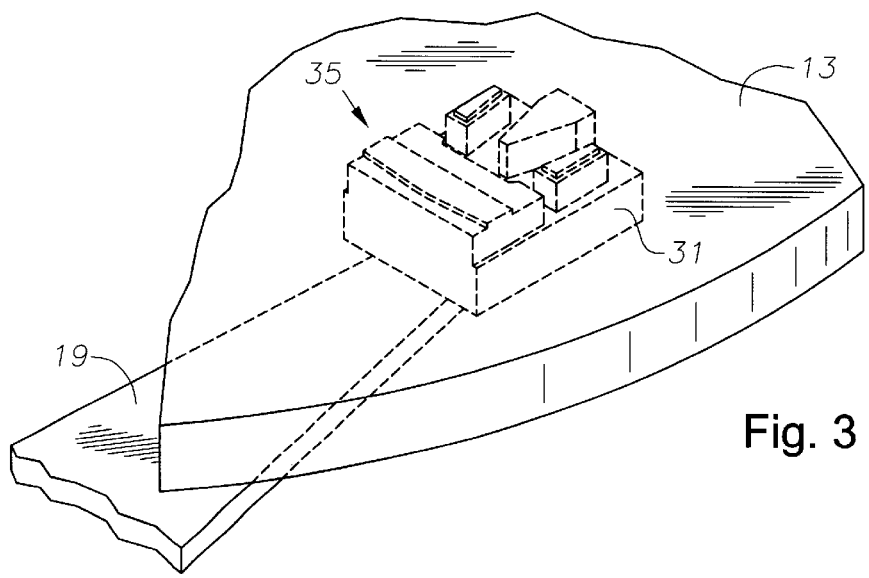
Fig. 3
Fig. 4
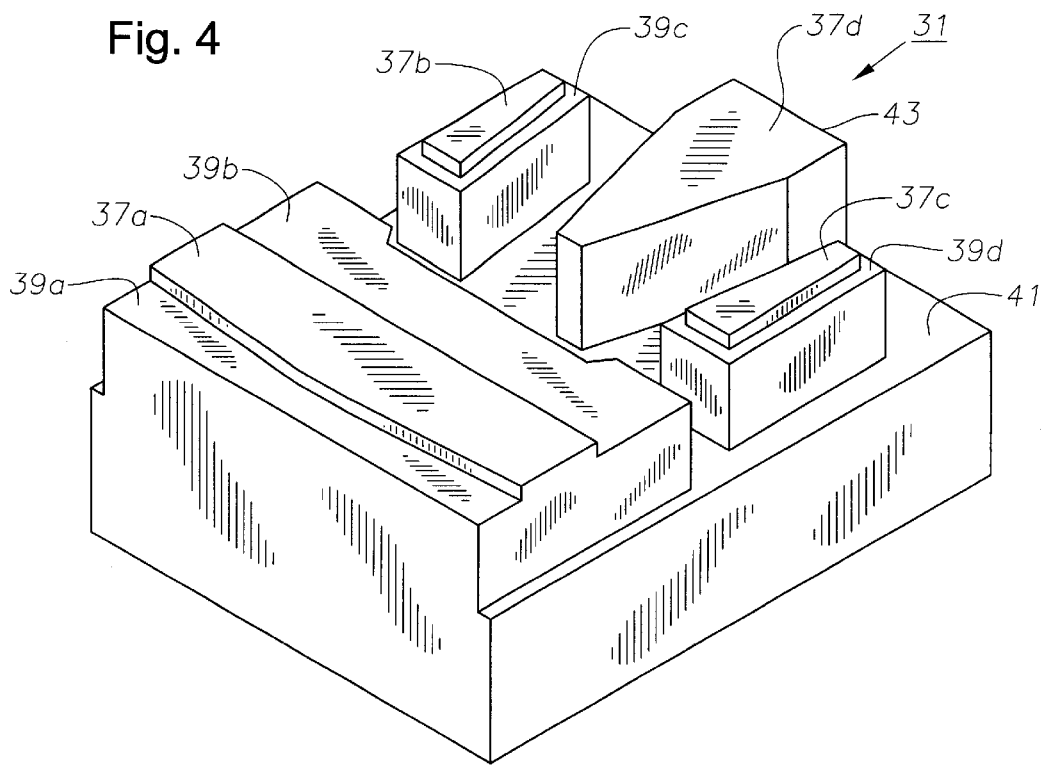

GLIDE HEAD WITH LOW SENSITIVITY

TECHNICAL FIELD

This invention relates in general to magnetic recording devices and in particular to an air bearing surface on a glide head that flies above magnetically recorded media at a relatively constant height.

BACKGROUND ART

A glide head is used to scan the surface of a disk in a disk drive in order to detect and burnish irregularities on the disk surface such as asperities. A piezoelectric pickup element mounted on the head vibrates when physical contact of the head with an irregularity occurs. The element emits a signal that characterizes the nature of the irregularity in terms of frequency and amplitude.

To successfully scan the disk surface, the glide head must fly steadily at a given fly height or glide height. Variations in glide height are dependent on the various sensitivities of the glide head and variability in related parameters. Common sensitivities include gram load, pivot location, crown and camber. Since the glide head is inherently exposed to wear (asperities and roughness), a low sensitivity to pad wear is highly desirable.

SUMMARY OF THE INVENTION

A glide head for burnishing or smoothing the surface of a magnetic disk has an air bearing on one side and a piezoelectric element on an opposite side. The air bearing comprises a patterned set of four or five air bearing surfaces (ABS) and etched pockets having multiple depths in the air bearing. The air bearing preferably has two front ABS, two middle ABS, and one rear ABS. This configuration gives the air bearing superior performance characteristics over prior art designs. When the glide head contacts a defect or asperity on the surface of the disk, the glide head vibrates and causes the piezoelectric element to become excited and emit a signal in response.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is a schematic isometric drawing of the glide head of FIG. 2 inverted on a lower side of the disk of FIG. 1.

FIG. 4 is a bottom isometric view of the glide head of FIG. 2.

BEST MODE FOR CARRYING OUT THE INVENTION

Figure 1:
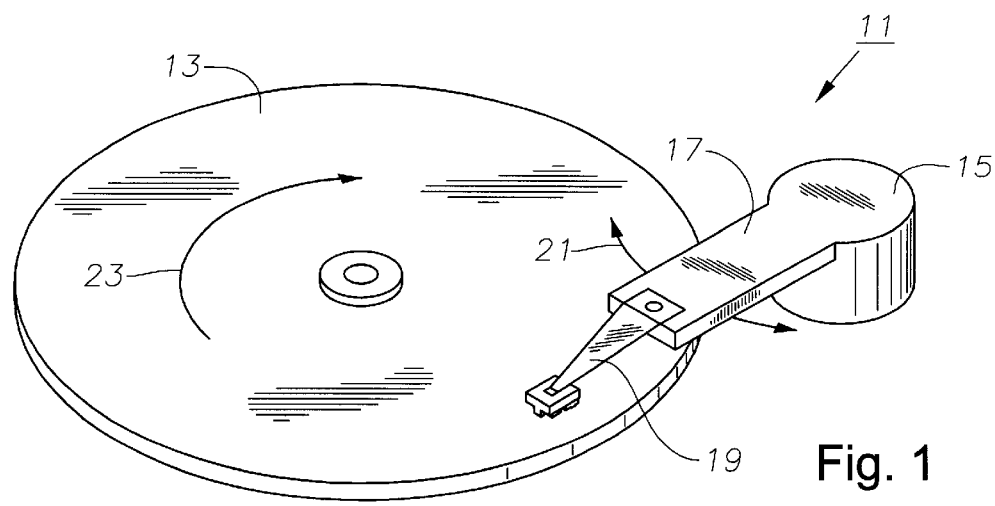
FIG. 1 is a schematic isometric drawing of an apparatus showing a disk and an actuator with a flying or glide head assembly.

Referring to FIG. 1, an apparatus 11 for burnishing or smoothing the surface of a rotating, magnetic disk 13 having a large plurality of tracks is shown. Apparatus 11 comprises an actuator 15 with a movable arm 17 and a suspension 19 on one end. Arm 17 and disk 13 move in the directions indicated by arrows 21, 23, respectively. Arm 17 provides the seek motion when changing tracks on disk 13.

Figure 2:
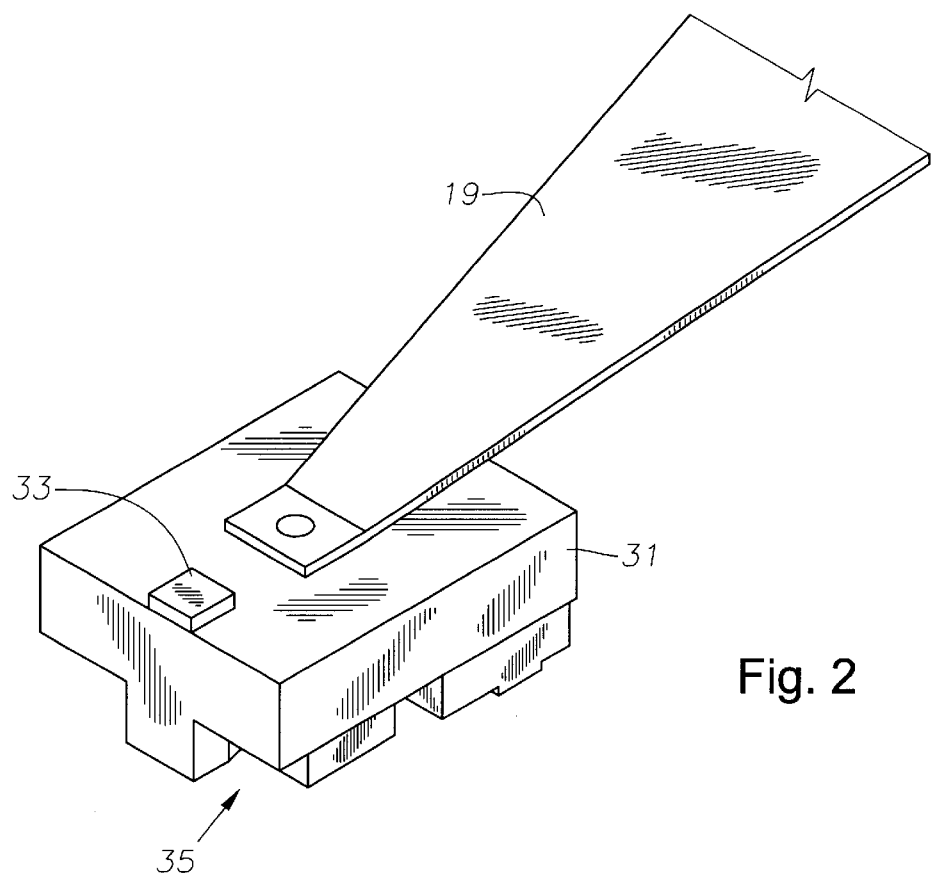
FIG. 2 is an enlarged isometric view of a first embodiment of a glide head on the glide head assembly of FIG. 1.
Figure 5:
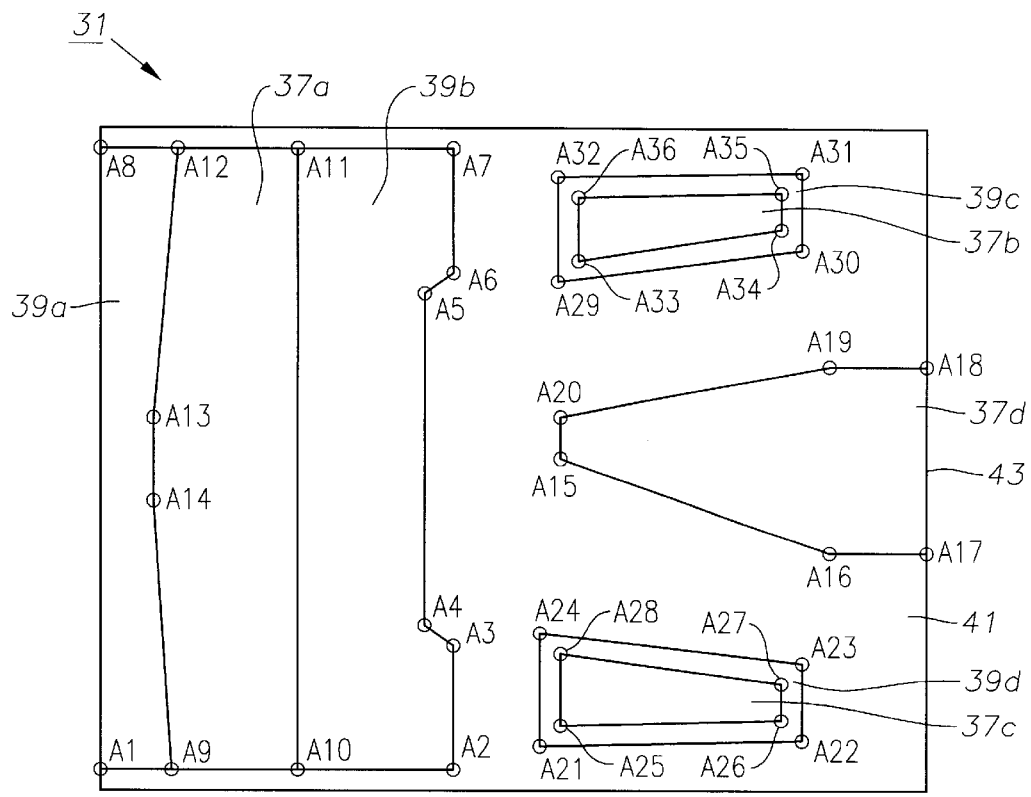
FIG. 5 is a bottom view of the glide head of FIG. 2.
Figure 6:
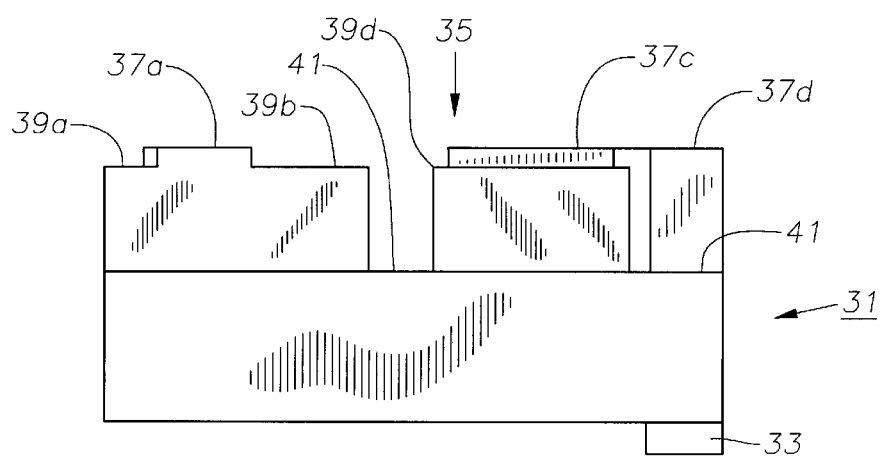
FIG. 6 is a side view of the glide head of FIG. 2.

As shown in FIG. 2, a slider or flying/glide head 31 is bonded to the end of suspension 19. In the embodiment shown, glide head 31 is nano size (approximately 2050×1600×450 microns) and formed from ceramic or intermetallic materials. Glide head 31 may also be pico size (approximately 1250×1000×300 microns). Glide head 31 is pre-loaded against the surface of disk 13 (in the range two to ten grams) by suspension 19. It is glide head 31 that burnishes the surface of disk 13 prior to disk 13 being used by data read/write heads (not shown).

Glide head 31 carries a piezoelectric element 33 (shown schematically) on its upper surface adjacent to suspension 19. The contacting side or air bearing 35 of head 31 which touches disk 13 is located opposite element 33. Element 33 produces an electrical voltage (PZT) signal when head 31 is mechanically excited, such as when air bearing 35 touches a protruding asperity on the surface of disk 13. The stronger the contact between head 31 and the asperity, the higher the signal produced. Thus, by proper calibration, head 31 can be used to determine the size of the disk defects.

As shown in FIGS. 3–6, the air bearing 35 of head 31 comprises a patterned set of elements, such as rails 37 and pockets 39, 41 which are the basis of this invention. The pockets 39, 41 are manufactured using standard etching techniques such as resistive ion etching (RIE) and ion milling (IO). Common etch depths range from about 0.1 to 5 microns. The rails 37, or portions of the air bearing 35 that have not been etched, are also called air bearing surfaces (ABS).

In this embodiment, head 31 has four rails or ABS 37a–d, four shallow pockets 39a–d (approximately 0.28 microns beneath ABS 37), and a deep, surrounding pocket 41 (approximately 1.60 microns beneath ABS 37) that abuts the leading, lateral, and trailing edges. The trailing edge 43 of air bearing 35 is defined by the rear edge of ABS 37d, which extends from pocket 41. ABS 37a extends from between pockets 39a, 39b, and ABS 37b, 37c extend from pockets 39c, 39d, respectively. ABS 37 are offset from the leading and lateral edges. Each ABS 37 has a perimeter with four sides. ABS 37a, 37d each have a hexagonal perimeter. Pocket 39b has an octagonal perimeter. In a preferred embodiment, head 31 is nano size and the precise location of the elements of air bearing 35 are defined by x-y Cartesian coordinates of nodes A1–A36 as listed below (see FIG. 5). Note that the elements of air bearing 35 are longitudinally and laterally asymmetric.

| Node | x (microns) | y (microns) |
|------|-------------|-------------|
| A1   | 0           | 50          |
| A2   | 854         | 50          |
| A3   | 854         | 350         |
| A4   | 784         | 400         |
| A5   | 784         | 1200        |
| A6   | 854         | 1250        |
| A7   | 854         | 1550        |
| A8   | 0           | 1550        |
| A9   | 171         | 50          |
| A10  | 476         | 50          |
| A11  | 476         | 1550        |
| A12  | 186         | 1550        |
| A13  | 127         | 900         |
| A14  | 127         | 700         |
| A15  | 1114        | 802         |
| A16  | 1766        | 575         |
| A17  | 2000        | 575         |
| A18  | 2000        | 1025        |
| A19  | 1766        | 1025        |
| A20  | 1114        | 902         |
| A21  | 1064        | 107         |
| A22  | 1700        | 120         |
| A23  | 1700        | 308         |
| A24  | 1064        | 381         |
| A25  | 1114        | 157         |
| A26  | 1650        | 170         |
| A27  | 1650        | 258         |
| A28  | 1114        | 331         |
| A29  | 1107        | 1229        |
| A30  | 1700        | 1305        |
| A31  | 1700        | 1493        |
| A32  | 1107        | 1482        |
| A33  | 1157        | 1279        |
| A34  | 1650        | 1355        |
| A35  | 1650        | 144         |
| A36  | 1157        | 1432        |

It should be apparent that the shape, location, and etching depths of the various elements on air bearing 35 may be readily varied and are not limited to the slider size nor dimensions suggested above.

There are several important parameters that measure the performance of head 31. Fly height is the separation between a point on the ABS 37 and disk 13, such as the center of the trailing edge 43 of air bearing 35 and the surface of disk 13. Pitch is the tilting of the flying slider in the longitudinal direction with respect to the plane of the disk 13. Roll is the tilting of the flying slider in the transversal direction with respect to the plane of the disk 13. Fly height, pitch, and roll are all dependent on parameters like ambient pressure, temperature, air viscosity, linear velocity (product of radius from center of disk 13 and disk angular velocity or rpm), skew angle (angle between the longitudinal axis of head 31 and the tangent to the current radius from the center of disk 13), pre-load (the force applied by suspension 19), suspension moments (moments applied in the pitch and roll directions by suspension 19), slider flatness, and the design of air bearing 35 itself (described in the previous paragraphs). The design of head 31 targets a velocity dependent, fly height profile, wherein the actual fly height increases with increasing slider velocity. The spacing between head 31 and disk 13 is completely described by fly height, together with its pitch and roll.

The performance of head 31 may also be measured in terms of sensitivities. The sensitivities of head 31 describe its change in fly height, pitch, or roll when another parameter that affects the fly height changes by one unit. For example, "sensitivity to pre-load" measures the decrease in fly height when the pre-load force is increased by one gram. "Sensitivity to slider flatness" is also an important parameter. The contact surfaces 37 of air bearing 35 are not perfectly flat since head 31 exhibits a longitudinal curvature or crown, a transversal curvature or camber, and a cross curvature or twist. Among these features, crown has the greatest effect on fly height.

In general, the parameters that affect fly height are associated with the suspension 19 (pre-load, location of the dimple with respect to the slider, and static attitudes in the pitch and roll directions), head 31 (flatness and size of ABS 37, etch depths, mask alignment, and rail width), and operating conditions (ambient temperature, pressure, viscosity, and velocity). It is desirable for head 31 to have low sensitivities since that implies that the departure of fly height from its desired target is small. Each parameter affecting fly height is described statistically by its mean and standard deviation. A tight distribution of values for a parameter around their mean implies that the spread or standard deviation is small.

For example, "fly height sigma" is a statistical estimator of the fly height variation of a group of heads 31. This parameter is proportional to the standard deviation of other parameters that affect fly height, and to the sensitivities of the design of air bearing 35. Thus, by designing head 31 to possess low sensitivities, and by ensuring that the manufacturing process is very repeatable, a tight distribution of fly heights is realized.

There are also a number of specific requirements for glide head 31 that must be met. First, the fly height of head 31 should match the fly height of the data head (not shown) as it responds to certain characteristics of disk 13. Since disk 13 is not perfectly flat and exhibits waviness or curvature that affects fly height, it is desirable that both data and glide heads respond equally to changes in the curvature of disk 13. There are at least two disk curvatures of interest. One is in the tangential direction and is related to the crown of the slider. Another is in the radial direction and is related to the camber of the slider. Because of the magnitude of the radial curvature near the rim of the disk (also called roll-off or ski jump), it is important for the glide head 31 to feature a low transversal curvature sensitivity. The flatness sensitivity of head 31 is important in this respect.

Another requirement for head 31 is low fly height and roll sigmas. Since head 31 is essentially a calibration device, its variability in fly height must be better than that of data heads. In particular, the roll standard deviation must be small since it is the spacing between the trailing edge 43 of head 31 and disk 13 that controls the detection of irregularities. If trailing edge 43 is perfectly parallel to disk 13, the clearance is uniform. Any amount of roll creates an uneven clearance between the head 31 and disk 13.

Since head 31 rubs and contacts defects on disk 13 and suffers from wear, it is also required to have good wear resistance. Resistance to wear ultimately affects fly height as well as the ability to produce good defect detection signals. As a related requirement, head 31 must have good load/unload performance. During operation, head 31 is loaded onto a spinning disk 13 and must establish its supportive air bearing to avoid contact with disk 13. Ideally, there will be no exposure to wear during the load/unload sequences.

Physical contact with defects on disk 13 can be a disturbing event on the fly height as it causes head 31 to lose support and crash on disk 13. Therefore, a robust and stable response to contact is required. Regardless of its size, head 31 also should match the response of the data head. If head 31 is larger than the data head, the construction of the piezoelectric element 33 is simplified, but matching the properties of the air bearing 35 is more difficult. In the preferred embodiment of the invention, head 31 is nano size and is well suited to match the target pico size data head. Head 31 is also required to be velocity dependent since the fly height needs to be controlled based on the disk radius and data head properties.

Finally, head 31 should produce a good PZT signal. Upon contact with an irregularity on the surface of disk 13, head 31 is excited and "rings" or vibrates. This vibration excites the piezoelectric element 33 mounted on head 31 and a voltage signal is generated. The signal should be sharp and noise free to provide a good measure of the defect size. The physical layout of the rails or ABS 37 determines the intensity and sharpness of the vibration of head 31.

Empirical testing of the design of head 31 confirms its superior performance over prior art glide heads. Some of the results of the experimentation are depicted below:

| Parameter | Velocity = 8 m/s | Velocity = 17 m/s |
| --- | --- | --- |
| Elem. (nm) | 9.94 | 35.84 |
| Minimum Fly Height (nm) | 9.32 | 35.20 |
| Pitch (urad) | 191.3 | 311.4 |
| Roll (urad) | 0.14 | −0.23 |
| Elem. sigma (nm) | 2.59 | 3.62 |
| Roll sigma (urad) | 8.61 | 17.87 |
| Crown sensitivity (nm/nm) | 0.102 | 0.343 |
| Camber sensitivity (nm/nm) | −0.061 | −0.128 |

In particular, note that glide head 31 has very low crown sensitivities and low fly height sigmas.

Figure 7:
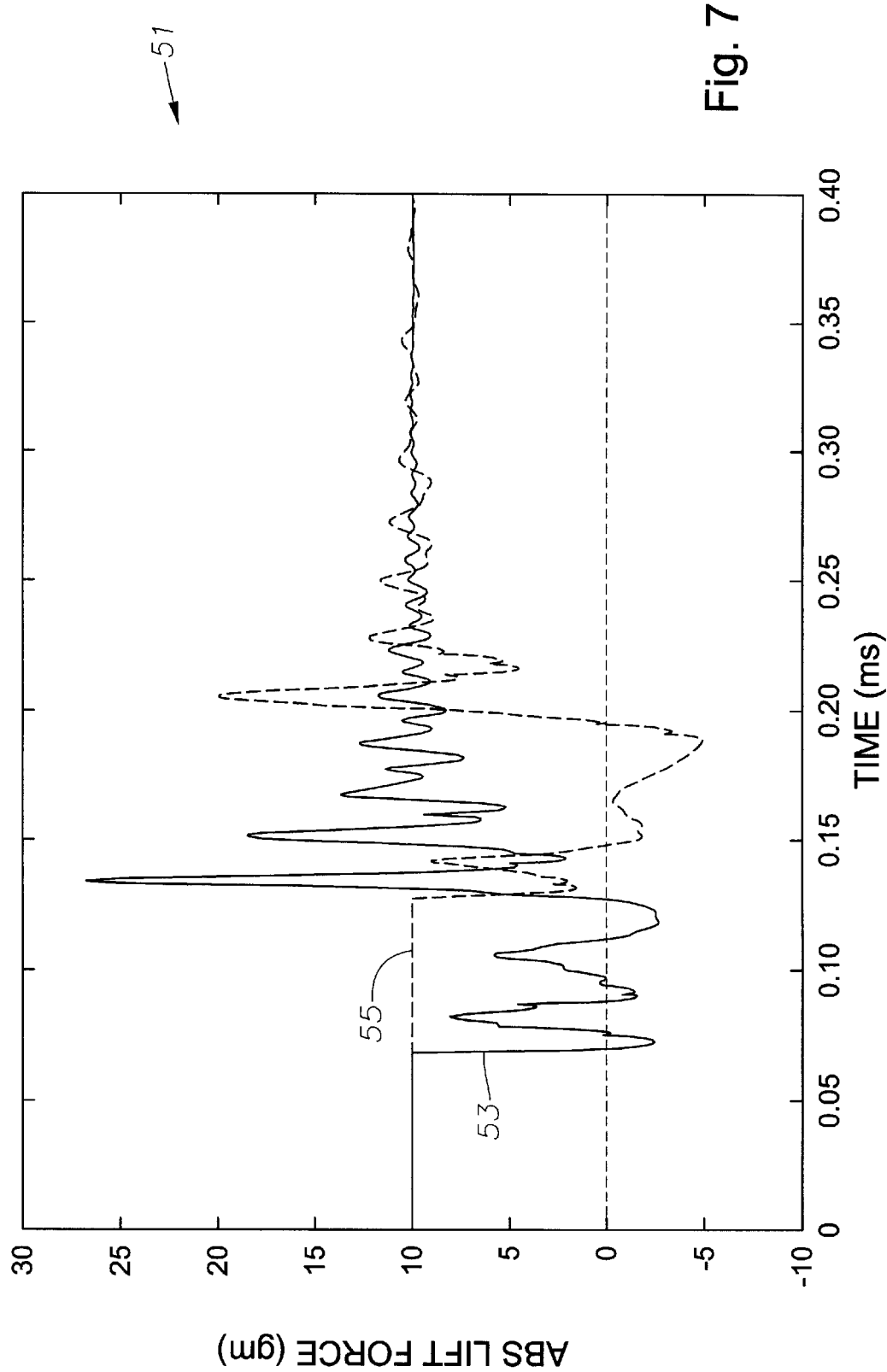
FIG. 7 is a graph of lift force versus time for the glide head of FIG. 2 and a prior art glide head.

Another performance indicator is shown as chart 51 in FIG. 7. In chart 51, the lift force provided by the ABS 37 of head 31 and those of a prior art glide head are depicted over time after each has contacted an asperity on disk 13 measuring 100 nm in height. The response of head 31 is depicted by solid line 53 and the response of the prior art head is shown by dashed line 55. Head 31 produces a sharper response signal and has a more rapid and consistent recovery than the prior art head.

Figure 8:
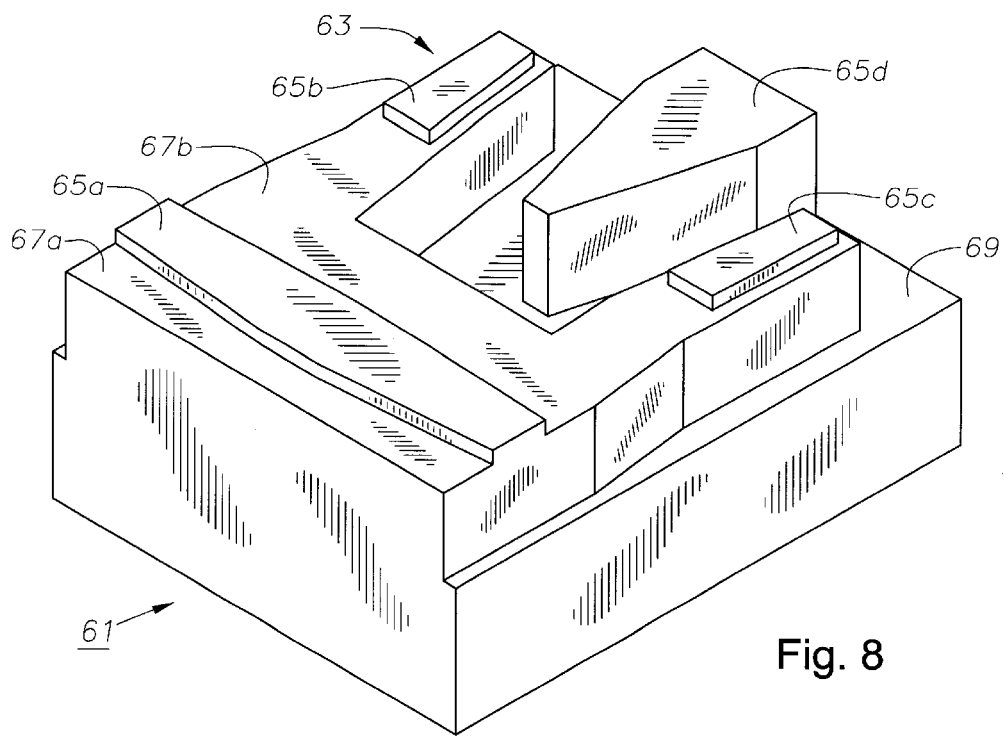
FIG. 8 is a bottom isometric view of a second embodiment of the glide head of FIG. 2.
Figure 9:
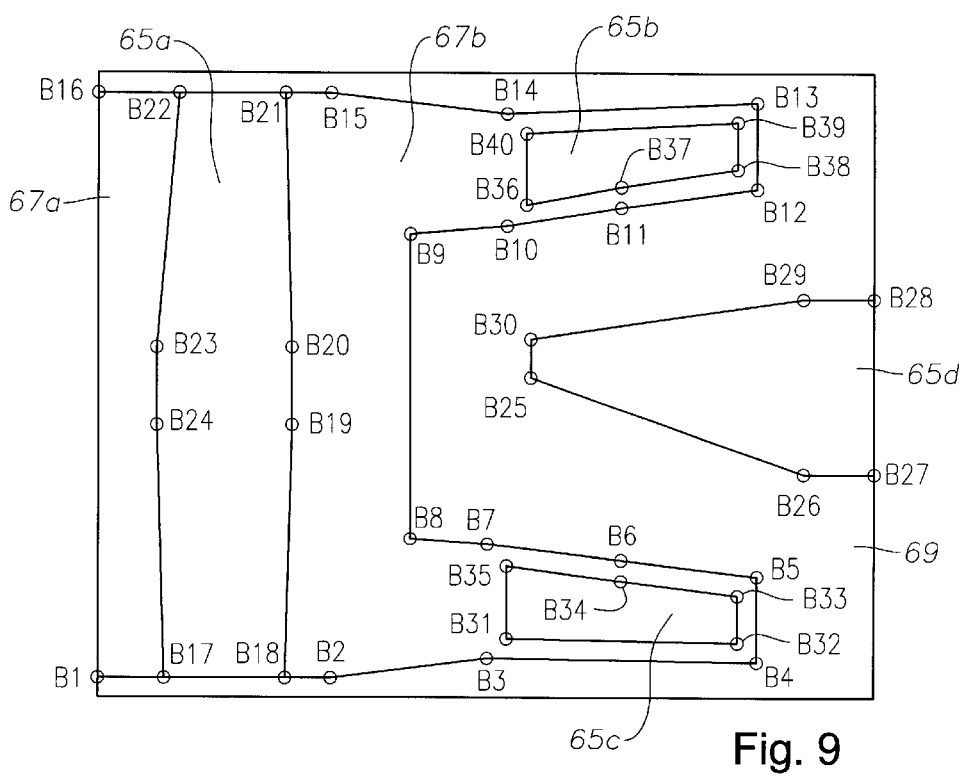
FIG. 9 is a bottom view of the glide head of FIG. 8.

Referring now to FIGS. 8 and 9, a second embodiment of the invention is shown as head 61. Head 61 is identical to head 31 except for the shape and size of the elements on its air bearing 63. Like head 31, head 61 has four ABS 65a–d, but only two shallow pockets 67a, 67b (approximately 0.28 microns beneath ABS 65), and one deep pocket 69 (approximately 1.60 microns beneath ABS 65). In the preferred embodiment, head 61 is also nano size and the precise location of the elements of air bearing 63 are defined by x-y Cartesian coordinates of nodes B1–B36 as listed below (see FIG. 9):

| Node | x (microns) | y (microns) |
| --- | --- | --- |
| B1 | 0 | 50 |
| B2 | 600 | 50 |
| B3 | 1004 | 101 |
| B4 | 1700 | 91 |
| B5 | 1700 | 313 |
| B6 | 1350 | 354 |
| B7 | 1004 | 395 |
| B8 | 805 | 409 |
| B9 | 805 | 1191 |
| B10 | 1055 | 1212 |
| B11 | 1350 | 1260 |

-continued

| Node | x (microns) | y (microns) |
| --- | --- | --- |
| B12 | 1700 | 1307 |
| B13 | 1700 | 1526 |
| B14 | 1055 | 1497 |
| B15 | 600 | 1550 |
| B16 | 0 | 1550 |
| B17 | 170 | 50 |
| B18 | 482 | 50 |
| B19 | 499 | 700 |
| B20 | 499 | 900 |
| B21 | 482 | 1550 |
| B22 | 208 | 1550 |
| B23 | 150 | 900 |
| B24 | 150 | 700 |
| B25 | 1116 | 821 |
| B26 | 1819 | 575 |
| B27 | 2000 | 575 |
| B28 | 2000 | 1025 |
| B29 | 1819 | 1025 |
| B30 | 1116 | 921 |
| B31 | 1054 | 151 |
| B32 | 1650 | 141 |
| B33 | 1650 | 263 |
| B34 | 1350 | 301 |
| B3S | 1054 | 340 |
| B36 | 1105 | 1267 |
| B37 | 1350 | 1312 |
| B38 | 1650 | 1357 |
| B39 | 1650 | 1476 |
| B40 | 1105 | 1447 |

Again, it should be apparent that the shape, location, and etching depths of the various elements on air bearing 63 may be readily varied and are not limited to the values described above. Some results of the experimentation for head 61 are depicted below:

| Parameter | Velocity = 8 m/s | Velocity = 17 m/s |
| --- | --- | --- |
| Elem. (nm) | 5.15 | 35.41 |
| Minimum Fly Height (nm) | 4.54 | 34.81 |
| Pitch (urad) | 193.1 | 342.5 |
| Roll (urad) | −0.18 | 0.06 |
| Elem. sigma (nm) | 1.25 | 6.28 |
| Roll sigma (urad) | 5.24 | 14.59 |
| Crown sensitivity (nm/nm) | 0.095 | 0.403 |
| Camber sensitivity (nm/nm) | −0.063 | −0.165 |

In particular, note that glide head 61 has very low crown sensitivities and low fly height sigmas.

Figure 10:
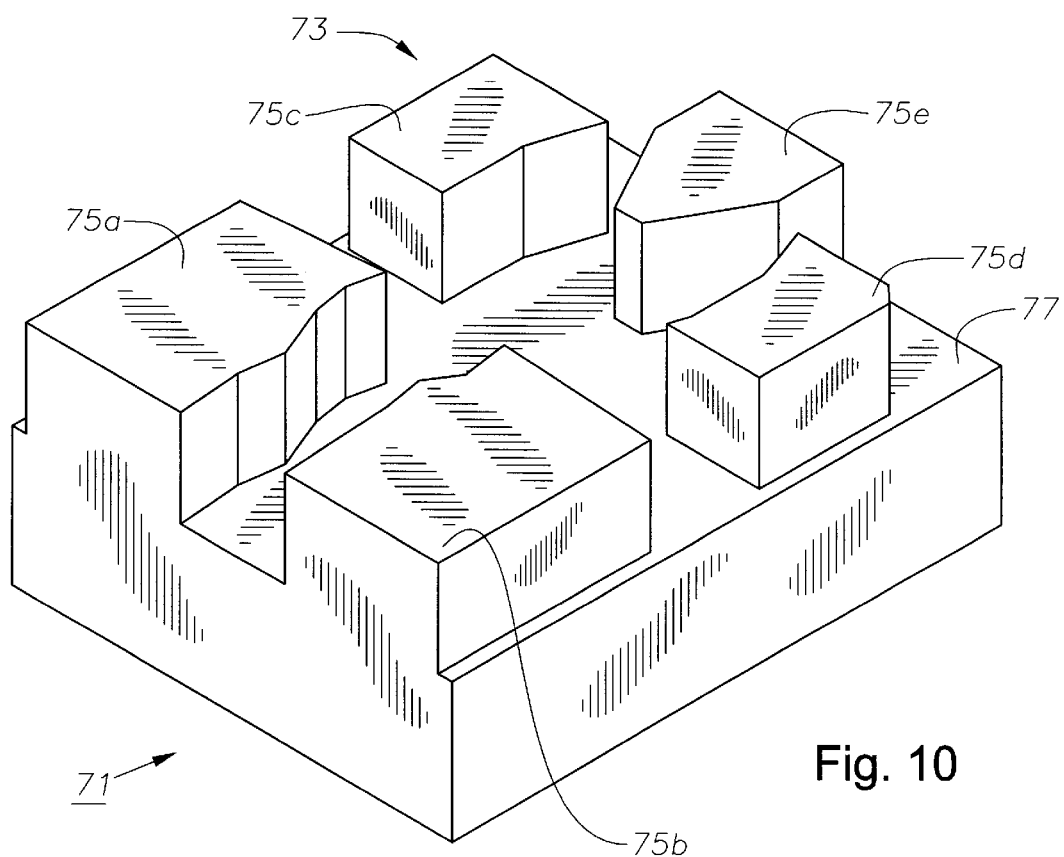
FIG. 10 is an isometric view of a third embodiment of the glide head of FIG. 2.

Referring now to FIG. 10, a third embodiment of the invention is shown as head 71. Head 71 is similar to heads 31, 61 except for the shape and size of the elements on its air bearing 73. Head 71 is longitudinally and laterally asymmetric, has five ABS 75a–e, and one deep pocket 77 (approximately 5.0 microns beneath ABS 75) from which ABS 75 extend. In the preferred embodiment, head 71 is configured as shown, but is not so limited. Pocket 77 abuts portions of the leading, lateral, and trailing edges of air bearing 73. ABS 75a, 75b abut the leading edge, but are offset from the lateral side edges, respectively. ABS 75c, 75d are laterally offset from both lateral and trailing edges, and ABS 75e abuts the trailing edge. All ABS 75 have a perimeter with at least six sides, and ABS 75a has eight sides. The test results for head 71 demonstrate that it is also a superior performer over the prior art glide head. Like the previous glide heads, glide head 71 has a very low crown sensitivity (0.127 nm/nm) and a low fly height sigma (2.50 nm).

The invention has several advantages. The use of four or five independent, air bearing surfaces or pads on a glide head having pockets with one or more etch depths as shown and described, allows the heads to have very low crown sensitivities, low fly height sigmas, and low sensitivities to pad wear. These glide heads also have good load/unload performance, handle impacts with asperities very well, and produce good PZT signals upon contact. In addition, the glide heads can be nano or pico size despite their wide trailing edge.

While the invention has been shown or described in only some of its forms, it should be apparent to those skilled in the art that it is not so limited, but is susceptible to various changes without departing from the scope of the invention.

I claim:

1. A glide head for burnishing the surface of a rotating a disk, comprising:
    a base having a first side and an opposite second side, the first side having a leading edge, a trailing edge, and two lateral edges;
    an air bearing formed on the first side of the base, and having at least four air bearing surfaces extending therefrom, at least two shallow pockets formed therein at a first depth relative to the air bearing surfaces, and a deep pocket formed therein at a second depth relative to the air bearing surfaces; and wherein
    one of the shallow pockets abuts the leading edge of the first side of the base and the second depth is substantially greater than the first depth.

2. The glide head of claim 1 wherein the air bearing is both longitudinally and laterally asymmetric.

3. The glide head of claim 1 wherein one of the air bearing surfaces abuts the trailing edge of the first side of the base.

4. The glide head of claim 1 wherein the deep pocket abuts portions of the leading, trailing, and lateral edges of the first side of the base.

5. The glide head of claim 1 wherein the air bearing surfaces are offset from the leading and lateral edges of the first side of the base.

6. The glide head of claim 1 wherein one of the air bearing surfaces extends from the deep pocket and the remaining air bearing surfaces extend from the shallow pockets.

7. The glide head of claim 1 wherein each of the air bearing surfaces has a perimeter formed from at least four sides.

8. The glide head of claim 1 wherein at least two of the air bearing surfaces have perimeters formed from at least six sides.

9. The glide head of claim 1 wherein one of the shallow pockets has a perimeter with at least eight sides.

10. The glide head of claim 1 wherein a first one of the air bearing surfaces is located between two of the shallow pockets, second and third ones of the air bearing surfaces are located adjacent to the lateral edges of the first side of the base, respectively, and a fourth one of the air bearing surfaces abuts the trailing edge of the first side of the base.

11. The glide head of claim 1 wherein the first depth of the shallow pocket is approximately 0.28 microns, and the second depth of the deep pocket is approximately 1.60 microns.

12. A glide head for burnishing the surface of a rotating a disk, comprising:
    a base having a first side and an opposite second side, the first side having a leading edge, a trailing edge, and two lateral edges;
    an air bearing formed on the first side of the base that is both longitudinally and laterally asymmetric; the air bearing comprising:
        four air bearing surfaces extending therefrom;
        three shallow pockets formed in the air bearing at a first depth relative to the air bearing surfaces, wherein one of the shallow pockets abuts the leading edge of the first side of the base;
        a deep pocket formed in the air bearing at a second depth relative to the air bearing surfaces, the second depth being substantially greater than the first depth; and wherein
        a first one of the air bearing surfaces is located between two of the shallow pockets, second and third ones of the air bearing surfaces are located adjacent to the lateral edges of the first side of the base, respectively, and a fourth one of the air bearing surfaces abuts the trailing edge of the first side of the base.

13. The glide head of claim 12 wherein the deep pocket abuts portions of the leading, trailing, and lateral edges of the first side of the base.

14. The glide head of claim 12 wherein the air bearing surfaces are offset from the leading and lateral edges of the first side of the base.

15. The glide head of claim 12 wherein one of the air bearing surfaces extends from the deep pocket and the remaining air bearing surfaces extend from the shallow pockets.

16. The glide head of claim 12 wherein two of the air bearing surfaces have a perimeter formed from at least four sides, two of the air bearing surfaces have perimeters formed from at least six sides, and one of the shallow pockets has a perimeter with at least eight sides.

17. The glide head of claim 12 wherein the first depth of the shallow pocket is approximately 0.28 microns, and the second depth of the deep pocket is approximately 1.60 microns.

18. A glide head for burnishing the surface of a rotating a disk, comprising:
    a base having a first side and an opposite second side, the first side having a leading edge, a trailing edge, and two lateral edges;
    an air bearing formed on the first side of the base that is both longitudinally and laterally asymmetric; the air bearing comprising:
        four air bearing surfaces extending therefrom;
        a shallow pocket formed in the air bearing at a first depth relative to the air bearing surfaces, the shallow pocket abutting the leading edge of the first side of the base and extending alongside the lateral edges of the first side of the base;
        a deep pocket formed in the air bearing at a second depth relative to the air bearing surfaces, the second depth being substantially greater than the first depth; and wherein
        three of the air bearing surfaces extend from the shallow pocket, wherein the first air bearing surface is offset from the leading edge, the second and third air bearing surfaces are offset from the lateral edges of the first side of the base, respectively, and the fourth air bearing surface abuts the trailing edge of the first side of the base.

19. The glide head of claim 18 wherein the deep pocket abuts portions of the leading, trailing, and lateral edges of the first side of the base.

20. The glide head of claim 18 wherein two of the air bearing surfaces have a perimeter formed from at least four sides, and two of the air bearing surfaces have perimeters formed from at least six sides.

21. The glide head of claim 18 wherein the first depth of the shallow pocket is approximately 0.28 microns, and the second depth of the deep pocket is approximately 1.60 microns.

22. A glide head for burnishing the surface of a rotating a disk, comprising:
- a base having a first side and an opposite second side, the first side having a leading edge, a trailing edge, and two lateral edges;
- an air bearing formed on the first side of the base that is both longitudinally and laterally asymmetric; the air bearing comprising:
- five air bearing surfaces extending therefrom;
- a pocket formed in the air bearing at a depth relative to the air bearing surfaces, the pocket abutting portions of the leading, lateral, and trailing edges of the first side of the base; and wherein
- all five of the air bearing surfaces extend from the pocket, wherein the first and second air bearing surfaces abut the leading edge, the third and fourth air bearing surfaces are offset from the lateral edges of the first side of the base, respectively, and the fifth air bearing surface abuts the trailing edge of the first side of the base.

23. The glide head of claim 22 wherein the first and second air bearing surfaces are offset from the lateral edges of the first side of the base.

24. The glide head of claim 22 wherein all of the air bearing surfaces have a perimeter formed from at least six sides, and one of the air bearing surfaces has a perimeter formed from at least eight sides.

25. The glide head of claim 22 wherein the depth of the pocket is approximately 5.0 microns.

26. A device for burnishing the surface of recording media, comprising:
- a disk having a surface with a plurality of tracks;
- an actuator with a movable arm and a suspension on one end that is movable relative to the recording media for accessing the tracks;
- a glide head mounted to the suspension for burnishing the surface of the recording media; the glide head comprising:
- a base having a first side and an opposite second side, the first side having a leading edge, a trailing edge, and two lateral edges;
- an air bearing formed on the first side of the base, and having at least four air bearing surfaces extending therefrom, at least two shallow pockets formed therein at a first depth relative to the air bearing surfaces, and a deep pocket formed therein at a second depth relative to the air bearing surfaces; and wherein
- one of the shallow pockets abuts the leading edge of the first side of the base and the second depth is substantially greater than the first depth.

27. The device of claim 26 wherein the air bearing is both longitudinally and laterally asymmetric.

28. The device of claim 26 wherein one of the air bearing surfaces abuts the trailing edge of the first side of the base.

29. The device of claim 26 wherein the deep pocket abuts portions of the leading, trailing, and lateral edges of the first side of the base.

30. The device of claim 26 wherein the air bearing surfaces are offset from the leading and lateral edges of the first side of the base.

31. The device of claim 26 wherein one of the air bearing surfaces extends from the deep pocket and the remaining air bearing surfaces extend from the shallow pockets.

32. The device of claim 26 wherein each of the air bearing surfaces has a perimeter formed from at least four sides.

33. The device of claim 26 wherein at least two of the air bearing surfaces have perimeters formed from at least six sides.

34. The device of claim 26 wherein one of the shallow pockets has a perimeter with at least eight sides.

35. The device of claim 26 wherein a first one of the air bearing surfaces is located between two of the shallow pockets, second and third ones of the air bearing surfaces are located adjacent to the lateral edges of the first side of the base, respectively, and a fourth one of the air bearing surfaces abuts the trailing edge of the first side of the base.

36. The device of claim 26 wherein the first depth of the shallow pocket is approximately 0.28 microns, and the second depth of the deep pocket is approximately 1.60 microns.

* * * * *